(12) United States Patent
Lee et al.

(10) Patent No.: US 11,027,189 B2
(45) Date of Patent: Jun. 8, 2021

(54) ENTERTAINMENT METHOD FOR SELF-DRIVING VEHICLE

(71) Applicants: Hyundai Motor Company, Seoul (KR); Kia Motors Corporation, Seoul (KR)

(72) Inventors: Baek Hee Lee, Gyeonggi-do (KR); Jin Hee Lee, Gyeonggi-do (KR); Min Hyuk Kwak, Seoul (KR); Yo Seob Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/653,407

(22) Filed: Oct. 15, 2019

(65) Prior Publication Data
US 2020/0346106 A1    Nov. 5, 2020

(30) Foreign Application Priority Data

May 2, 2019  (KR) .................. 10-2019-0051567

(51) Int. Cl.
*A63F 13/218*   (2014.01)
*B60N 2/02*     (2006.01)
(Continued)

(52) U.S. Cl.
CPC .......... *A63F 13/218* (2014.09); *A63F 13/214* (2014.09); *A63F 13/285* (2014.09); *A63F 13/803* (2014.09); *B60N 2/002* (2013.01); *B60N 2/0244* (2013.01); *B60N 2/24* (2013.01); *B60N 2/976* (2018.02); *G06F 3/011* (2013.01); *G06F 3/016* (2013.01); *G06F 3/03547* (2013.01);
(Continued)

(58) Field of Classification Search
CPC ............................ A63F 13/218; A63F 13/214
See application file for complete search history.

(56) References Cited

U.S. PATENT DOCUMENTS 9,108,733 B2 * 8/2015 Sizelove .................. A47C 7/74
10,650,331 B1 * 5/2020 Mossoba ............ G07C 9/00309
(Continued)

OTHER PUBLICATIONS

"MBUX im CLA spieltauf dem MWC 2019 einen Mario-Kart-Klon" published by ComputerBase on Youtube on Feb. 25, 2019, printed and accessed from URL <https://www.youtube.com/watch?v=DkEe8zKMhlA&feature=emb_title>, 4 pages. (Year: 2019).*
(Continued)

*Primary Examiner* — Jay Trent Liddle
(74) *Attorney, Agent, or Firm* — Mintz Levin Cohn Ferris Glovsky and Popeo, P.C.; Peter F. Corless

(57) ABSTRACT

An entertainment device and method for a self-driving vehicle enable a passenger to play a game while watching a game execution screen of a display mounted around a seat in a state where the passenger is seated on the seat of a self-driving vehicle, and execute and proceed with the game based on a signal that senses a body pressure distribution of the passenger in a body pressure sensor mounted on the seat, and a signal that senses the touch pressure of the passenger in a touch pad mounted on the seat, thereby allowing the passenger to enjoy various games related to the body pressure and/or the touch signal while the passenger moves his or her body.

13 Claims, 14 Drawing Sheets

(51) Int. Cl.
*B60N 2/24* (2006.01)
*B60N 2/90* (2018.01)
*G06F 3/01* (2006.01)
*G06F 3/0354* (2013.01)
*G06K 9/00* (2006.01)
*A63F 13/214* (2014.01)
*A63F 13/803* (2014.01)
*A63F 13/285* (2014.01)
*B60N 2/00* (2006.01)
*G06F 3/0482* (2013.01)

(52) U.S. Cl.
CPC .. *G06K 9/00302* (2013.01); *B60N 2002/0268* (2013.01); *G06F 3/0482* (2013.01); *G06F 2203/011* (2013.01)

(56) References Cited

U.S. PATENT DOCUMENTS

| | | | | |
|---|---|---|---|---|
| 2008/0129684 A1* | 6/2008 | Adams | ............ | B60K 35/00 345/156 |
| 2009/0085383 A1* | 4/2009 | Hicks | ............ | B60K 37/06 297/217.3 |
| 2009/0206641 A1* | 8/2009 | Brown, Jr. | ............ | A47C 15/004 297/217.3 |
| 2012/0302302 A1* | 11/2012 | Hamlin | ............ | G07F 17/3202 463/7 |
| 2012/0302323 A1* | 11/2012 | Gagner | ............ | G07F 17/3202 463/25 |
| 2012/0315971 A1* | 12/2012 | Granger | ............ | G07F 17/3216 463/16 |
| 2012/0315985 A1* | 12/2012 | Granger | ............ | G07F 17/3216 463/31 |
| 2013/0005442 A1* | 1/2013 | Erickson | ............ | G07F 17/32 463/25 |
| 2014/0309035 A1* | 10/2014 | Crawford | ............ | A63F 13/803 463/36 |
| 2014/0319895 A1* | 10/2014 | Lange-Mao | ............ | B60N 2/0224 297/463.1 |
| 2015/0350413 A1* | 12/2015 | Ma | ............ | H04M 1/7253 455/418 |
| 2017/0041816 A1* | 2/2017 | Cho | ............ | H04W 24/08 |
| 2017/0123423 A1* | 5/2017 | Sako | ............ | G05D 1/0088 |
| 2017/0169690 A1* | 6/2017 | Pfeiffer | ............ | B60N 2/0232 |
| 2019/0003876 A1* | 1/2019 | Aina | ............ | B60R 21/01516 |
| 2020/0041997 A1* | 2/2020 | Tuukkanen | ............ | B60W 30/0956 |

OTHER PUBLICATIONS

"Mercedes Will Let You Play Racing Video Games In Your Car" written by Jared Rosenholtz, published on Mar. 8, 2019, printed and accessed from URL <https://carbuzz.com/news/mercedes-will-let-you-play-racing-video-games-in-your-car>, 6 pages. (Year: 2019).*

"We played video games inside a Tesla Model 3: Tesla Arcade" published by Autoblog on Youtube on Jul. 2, 2019, printed and accessed from URL <https://www.youtube.com/watch?v=buN9rlQgVWM>, 9 pages. (Year: 2019).*

* cited by examiner

[ DISPLAY UNUSED ]  [ DISPLAY USED ]
(NORMAL POSTURE)  [ DISPLAY USED ]
(FULLY RECLINING POSTURE)

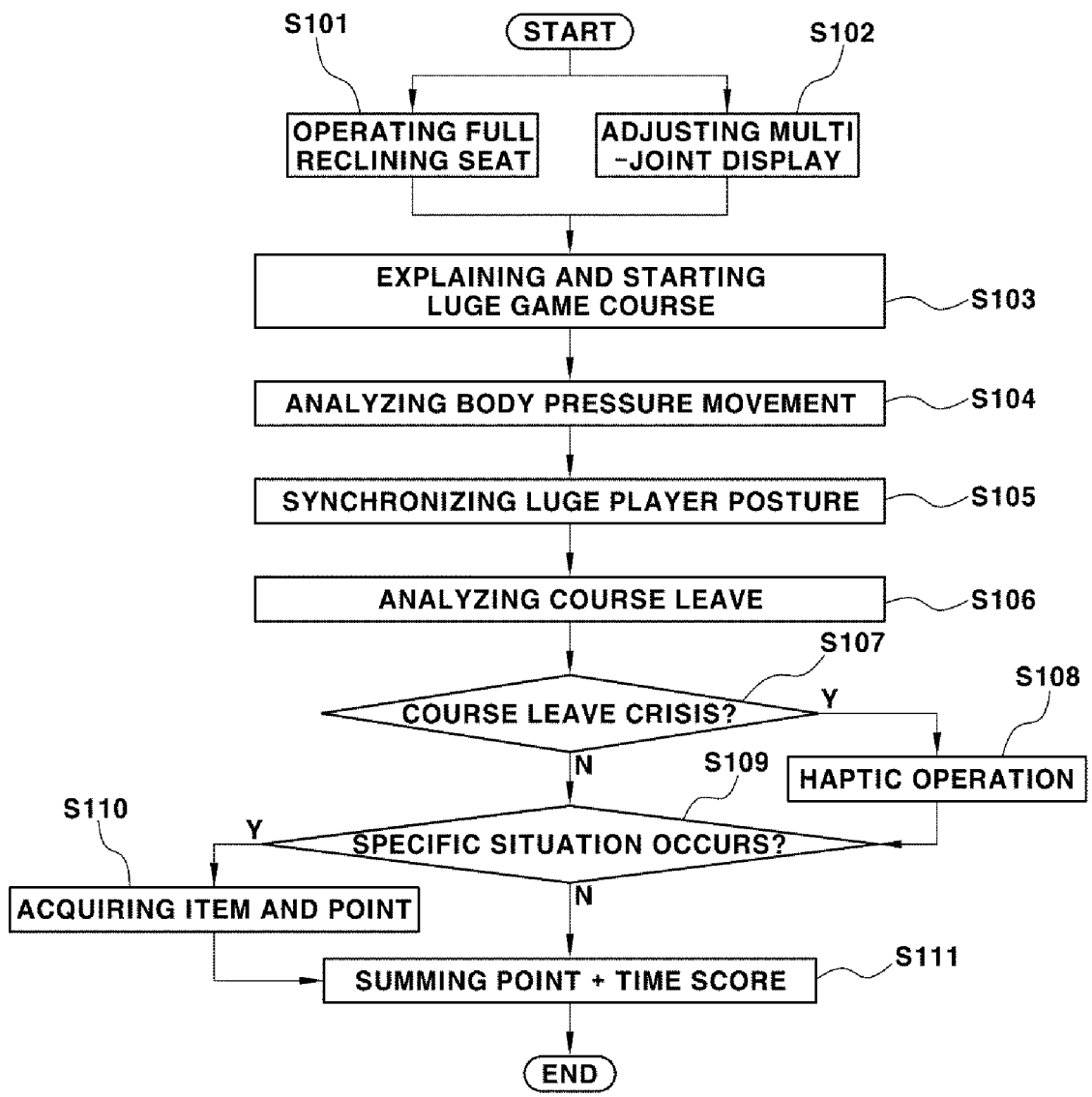

ENTERTAINMENT METHOD FOR SELF-DRIVING VEHICLE

CROSS-REFERENCE TO RELATED APPLICATION

This application claims under 35 U.S.C. § 119(a) the benefit of Korean Patent Application No. 10-2019-0051567 filed on May 2, 2019, the entire contents of which are incorporated herein by reference.

BACKGROUND

(a) Technical Field

The present disclosure relates to an entertainment method for a self-driving vehicle, more particularly, to the entertainment method by which a user may enjoy various games by using a body pressure sensor and a touch pad, etc. mounted on a seat.

(b) Description of the Related Art

In the case of a self-driving vehicle capable of traveling without a driver's operation, passengers who are seated may ride in an interior of the vehicle in various postures for conversing between the parties, external scenery viewing, reading, rest, sleep, etc.

For this purpose, a seat for the self-driving vehicle includes various mechanisms so as to enable positional movement of the seat, swiveling, etc., in addition to a basic mechanism for front-rear position adjustment of the seat, vertical height adjustment, reclining function, etc.

In the self-driving vehicle, although a seat mechanism dedicated to the self-driving vehicle is being developed for implementing various postures of a passenger, it is likely that the posture of the passenger remains in a relatively static posture within a limited space for long distance traveling, such that the passenger may be constrained in movement, and thus experience stiffness, stuffiness, and/or boredom.

For example, in the case of the self-driving vehicle, a passenger typically spends most of his or her time in the limited space during long distance traveling using a cell phone (e.g., smart phone), looking at external scenery, reading a book, using a computer, etc. while keeping the static posture, thereby causing boredom due to lack of the body movement, serious adverse motion sickness, etc.

Therefore, there is a need to provide entertainment options for reducing boredom of the passenger while providing an exercise effect that moves the body during long distance traveling of the self-driving vehicle.

The above information disclosed in this Background section is only for enhancement of understanding of the background of the disclosure and therefore it may contain information that does not form the prior art that is already known in this country to a person of ordinary skill in the art.

SUMMARY

The present disclosure provides an entertainment method for a self-driving vehicle, to enable a passenger to play a game while watching a game execution screen of a display mounted around a seat in a state where the passenger is seated on the seat of a self-driving vehicle, and execute and proceed with the game based on a signal that senses a body pressure distribution of the passenger in a body pressure sensor mounted on the seat, and a signal that senses a touch pressure of the passenger on a touch pad mounted on the seat, thereby enabling the passenger to enjoy various games related to the body pressure and/or the touch signal while the passenger moves his or her body.

An embodiment of the present disclosure for achieving the object provides an entertainment device for a self-driving vehicle configured to include a body pressure sensor module arranged in the laterally symmetrical positions of a seat back and a seat cushion to sense the upper body pressure and lower body pressure distributions of a passenger; a touch pad arranged in the positions of the seat back and the seat cushion where his/her hand reaches to sense the touch pressure of the passenger; a display unit disposed at a position around the seat visible to the passenger to display an execution screen of a game selected by the passenger; and a control unit for controlling the overall execution of the game selected by the passenger based on sensing signals of the first and second body pressure sensor modules and a sensing signal of the touch pad while outputting the execution screen of the game selected by the passenger to the display unit.

The body pressure sensor module is composed of a first body pressure sensor module arranged in the laterally symmetrical positions of the seat back to sense the upper body pressure of the passenger; and a second body pressure sensor module arranged in the laterally symmetrical positions of the seat cushion to sense the lower body pressure of the passenger.

Preferably, the first body pressure sensor module is configured to include a $1\text{-}1^{th}$ left body pressure sensor for sensing the body pressure of the left upper back of the passenger; a $1\text{-}2^{th}$ left body pressure sensor for sensing the body pressure of the left middle back of the passenger; a $1\text{-}3^{th}$ left body pressure sensor for sensing the body pressure of the left waist of the passenger; a $1\text{-}1^{th}$ right body pressure sensor for sensing the body pressure of the right upper back of the passenger; a $1\text{-}2^{th}$ right body pressure sensor for sensing the body pressure of the right middle back of the passenger; and a $1\text{-}3^{th}$ right body pressure sensor for sensing the body pressure of the right waist of the passenger.

Preferably, the second body pressure sensor module is configured to include a $2\text{-}1^{th}$ left body pressure sensor for sensing the body pressure of the left hip of the passenger; a $2\text{-}2^{th}$ left body pressure sensor for sensing the body pressure of the left thigh of the passenger; a $2\text{-}1^{th}$ right body pressure sensor for sensing the body pressure of the right hip of the passenger; and a $2\text{-}2^{th}$ right body pressure sensor for sensing the body pressure of the right thigh of the passenger.

The touch pad is selected from one of a plurality of touch pads, where the plurality of touch pads is configured to include first, second, and third left touch pads arranged in a left edge position of the seat back to be spaced apart from each other along a vertical direction; first, second, and third right touch pads arranged in a right edge position of the seat back to be spaced apart from each other along the vertical direction; first and second lower touch pads arranged in a front edge position of the seat cushion to be spaced apart from each other along a lateral direction; and first and second upper touch pads arranged in both side portions of a headrest.

The display unit is composed of a multi-joint link turnably connected to an armrest mounted on one side portion of the seat; and a display rotatably mounted on the distal end portion of the multi-joint link.

The control unit is configured to include a game selection input section for inputting a game type and a mode; a game execution control section for applying an activation signal to the body pressure sensor module and the touch pad while executing the game type and the mode inputted through the game selection input section; a game operation computing section for computing a game proceeding operation of a current passenger by receiving the sensing signals of the body pressure sensor module and the touch pad, and then inputting the computed result to the game execution control section; and a game output section for outputting a game execution screen and a sound according to the instruction of the game execution control section.

Preferably, the game execution control section includes a game storing section for storing the game types using the body pressure and the touch, and the game types using only the body pressure or the touch, as a game selectable by the passenger.

In addition, the control unit is configured to further include a seat posture control section for outputting an adjustment signal of the seat posture suitable for the game type and the mode inputted through the game selection input section; a seat position driving section for adjusting the seat posture according to the instruction of the seat posture control section; and a seat vibrating section for vibrating the seat in a specific situation while the game is executed according to the instruction of the game execution control section.

Preferably, the seat position driving section is adopted as an electric reclining device mounted on the seat back, and an electric height adjusting device mounted on the seat cushion.

Preferably, the seat vibrating section is adopted as a vibrating element mounted at a predetermined position of the seat back or the seat cushion to provide the haptic reaction.

In addition, the entertainment device for the self-driving vehicle of the present disclosure further includes a facial expression recognizing camera for determining whether to end the game by recognizing the facial expression of the passenger while the passenger proceeds with the game.

Another embodiment of the present disclosure for achieving the object provides an entertainment method for a self-driving vehicle including selecting and inputting a game type and a mode by a passenger through a game selection input section; applying an activation signal to a body pressure sensor module and a touch pad mounted on a seat while executing the game type and the mode selected by the passenger in a game execution control section; sensing the body pressure distribution and the touch pressure of the passenger in the body pressure sensor module and the touch pad; computing a game proceeding operation of a current passenger by receiving sensing signals of the body pressure sensor module and the touch pad in a game operation computing section, and then inputting the computed result to the game execution control section; and outputting a game execution screen and a sound according to the instruction of the game execution control section in a game output section.

The game execution control section executes the game selected by the passenger among the game types using the body pressure and the touch stored in a game storing section, and the game types using only the body pressure or the touch.

The entertainment method according to another embodiment of the present disclosure further includes outputting an adjustment signal of the seat posture suitable for the game type and the mode inputted through the game selection input section in a seat posture control section; and adjusting the seat posture according to the instruction of the seat posture control section in a seat position driving section.

In addition, the entertainment method according to another embodiment of the present disclosure further includes vibrating the seat in a specific situation while the game is executed according to the instruction of the game execution control section in a seat vibrating section.

In addition, the entertainment method according to another embodiment of the present disclosure further includes recommending whether to end the game while the passenger proceeds with the game.

Preferably, recommending whether to end the game proceeds with recognizing the facial expression of the passenger in a facial expression recognizing camera while the passenger proceeds with the game; inputting an end recommendation signal to the game execution control section in the facial expression recognizing camera, when the facial expression of the passenger expresses boredom or tiredness; and outputting a message that recommends to end the game or recommends whether to proceed to another game to a display in the game execution control section.

Alternatively, recommending whether to end the game proceeds with counting a game execution time in the game execution control section; and outputting a message that recommends to end the game or recommends whether to proceed to another game to a display in the game execution control section, when the game execution time is equal to or greater than a certain time.

The present disclosure provides the following effects through the above configurations.

Firstly, it is possible to provide the entertainment effect that makes the passenger feel fun out of boredom while providing the exercise effect that moves the body to the passenger at the long distance traveling of the self-driving vehicle, which will be released later.

Secondly, it is possible to execute and proceed the game based on the body pressure distribution signal sensed in the body pressure sensor when the passenger moves the upper body and the lower body, etc. in a state where he/she is seated on the seat equipped with the body pressure sensor and the touch pad, and the touch pressure signal that touches the touch pad while moving the arm and the finger, thereby enjoying various games related to the body pressure and/or the touch signal.

Thirdly, as the game using the body pressure and/or the touch pressure, it is possible to enjoy various games such as a mole game, a shooting game, a balancing game, a maze game, a flying game, and a racing game including a luge game, where the luge game may simulate a luge race, e.g., from the Winter Olympics.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIG. 6A is a flowchart illustrating a procedure of executing a luge game using the entertainment device for the self-driving vehicle according to the present disclosure.

Figure 1:
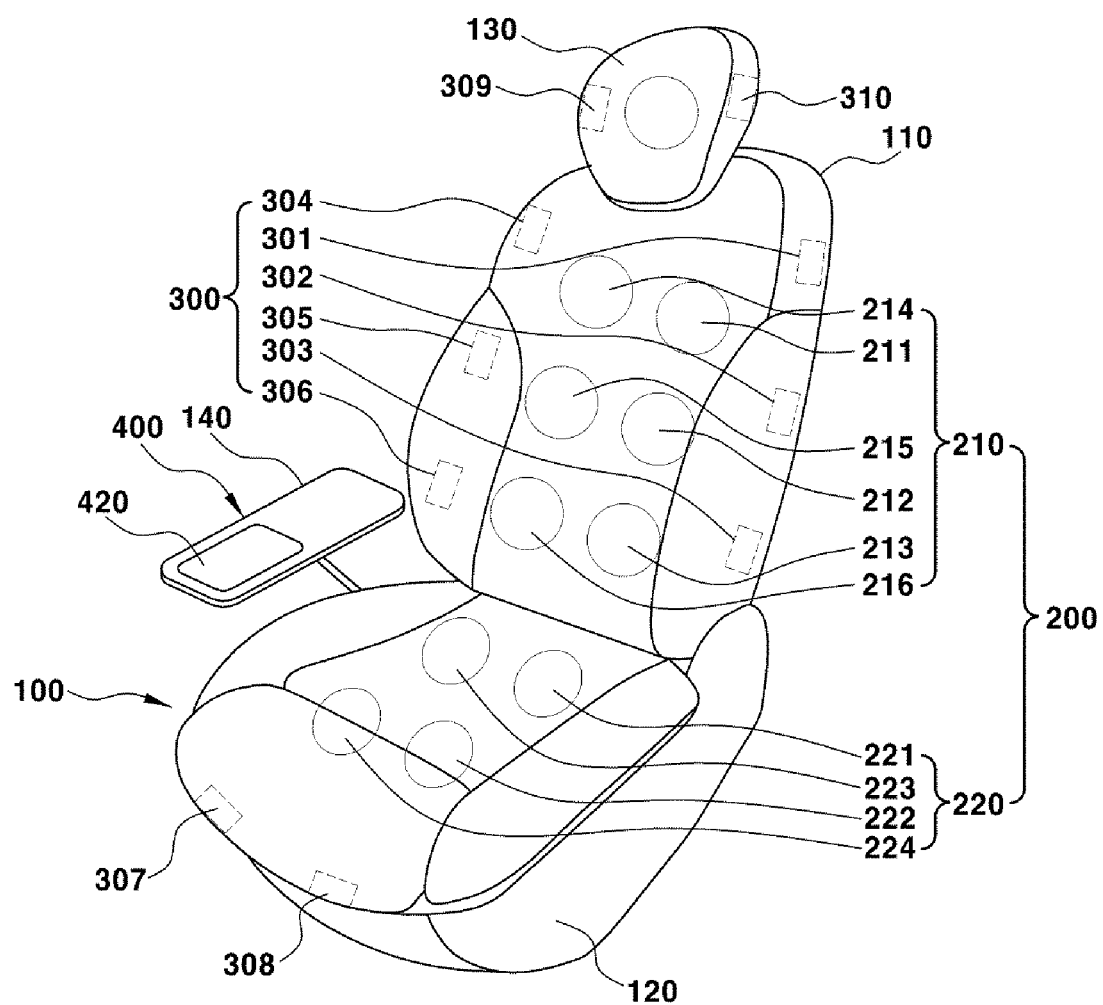
FIG. 1 is a configuration diagram illustrating a configuration of an entertainment device of a self-driving vehicle according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the drawings, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of the present disclosure will be described in detail with reference to the accompanying drawings.

FIG. 1 is a configuration diagram illustrating a configuration of an entertainment device for a self-driving vehicle according to the present disclosure, and reference numeral 100 denotes a seat in a self-driving vehicle.

The seat 100 is composed of a seat back 110 for supporting an upper body of a passenger, a seat cushion 120 for supporting a lower body of the passenger, and a headrest 130 for supporting ahead portion of the passenger.

A body pressure sensor module 200 for sensing upper body pressure and lower body pressure distributions of the passenger so as to be used an input signal for proceeding with a game is mounted at laterally symmetrical positions of the seat back 110 and the seat cushion 120.

As illustrated in FIG. 1, the body pressure sensor module 200 is composed of a first body pressure sensor module 210 arranged in (e.g., build into) the laterally symmetrical positions of the seat back 110 to sense the upper body pressure distribution of the passenger, and a second body pressure sensor module 220 arranged in the laterally symmetrical positions of the seat cushion 120 to sense the lower body pressure distribution of the passenger.

Preferably, the first body pressure sensor module 210 is configured to sense a body pressure distribution change when the upper body of the passenger is in close contact with the seat back 110, and composed of a $1\text{-}1^{th}$ left body pressure sensor 211 for sensing the body pressure of the left upper back of the passenger, a $1\text{-}2^{th}$ left body pressure sensor 212 for sensing the body pressure of the left middle back of the passenger, a $1\text{-}3^{th}$ left body pressure sensor 213 for sensing the body pressure of the left waist of the passenger, a $1\text{-}1^{th}$ right body pressure sensor 214 for sensing the body pressure of the right upper back of the passenger, a $1\text{-}2^{th}$ right body pressure sensor 215 for sensing the body pressure of the right middle back of the passenger, and a $1\text{-}3^{th}$ right body pressure sensor 216 for sensing the body pressure of the right waist of the passenger.

In particular, the 1-1$^{th}$ left body pressure sensor 211, the 1-2$^{th}$ left body pressure sensor 212, and the 1-3$^{th}$ left body pressure sensor 213 are arranged in the left region of the seat back 110 at regular intervals along a vertical direction, and the 1-1$^{th}$ right body pressure sensor 214, the 1-2$^{th}$ right body pressure sensor 215, and the 1-3$^{th}$ right body pressure sensor 216 are arranged in the right region of the seat back 110 at regular intervals along the vertical direction.

Preferably, the second body pressure sensor module 220 is composed of a 2-1$^{th}$ left body pressure sensor 221 for sensing the body pressure of the left hip of the passenger, a 2-2$^{th}$ left body pressure sensor 222 for sensing the body pressure of the left thigh of the passenger, a 2-1$^{th}$ right body pressure sensor 223 for sensing the body pressure of the right hip of the passenger, and a 2-2$^{th}$ right body pressure sensor 224 for sensing the body pressure of the right thigh of the passenger.

At this time, the 2-1$^{th}$ left body pressure sensor 221 and the 2-2$^{th}$ left body pressure sensor 222 are arranged in the left region of the seat cushion 120 at regular intervals along a front-rear direction, and the 2-1$^{th}$ right body pressure sensor 223 and the 2-2$^{th}$ right body pressure sensor 224 are arranged in the right region of the seat cushion 120 at regular intervals along the front-rear direction.

Figure 4:
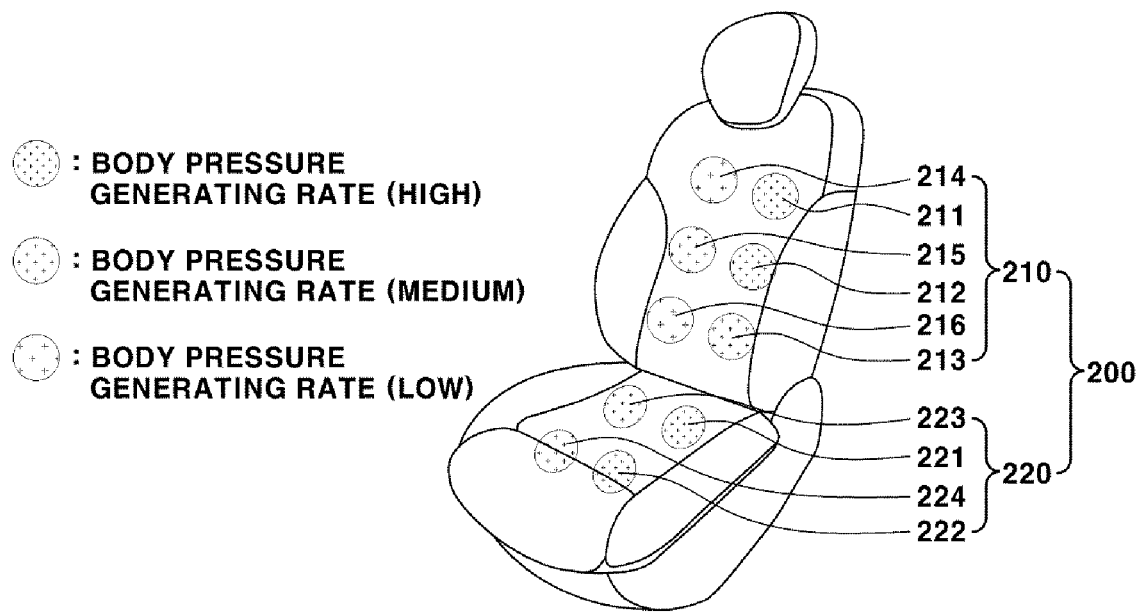
FIG. 4 is a schematic diagram illustrating an example in which a body pressure generating degree and a body pressure generating rate sensed by each body pressure sensor in the configuration of the entertainment device for the self-driving vehicle according to the present disclosure are changed.

Therefore, the first body pressure sensor module 210 senses the upper body pressure distribution of the passenger, and the second body pressure sensor module 220 senses the lower body pressure distribution of the passenger, and as illustrated in FIG. 4, sensing may be performed by classifying a body pressure generating rate into high, medium, low, etc., respectively, and then transmitting it to a game operation computing section 530 of a control unit 500.

Figure 2:
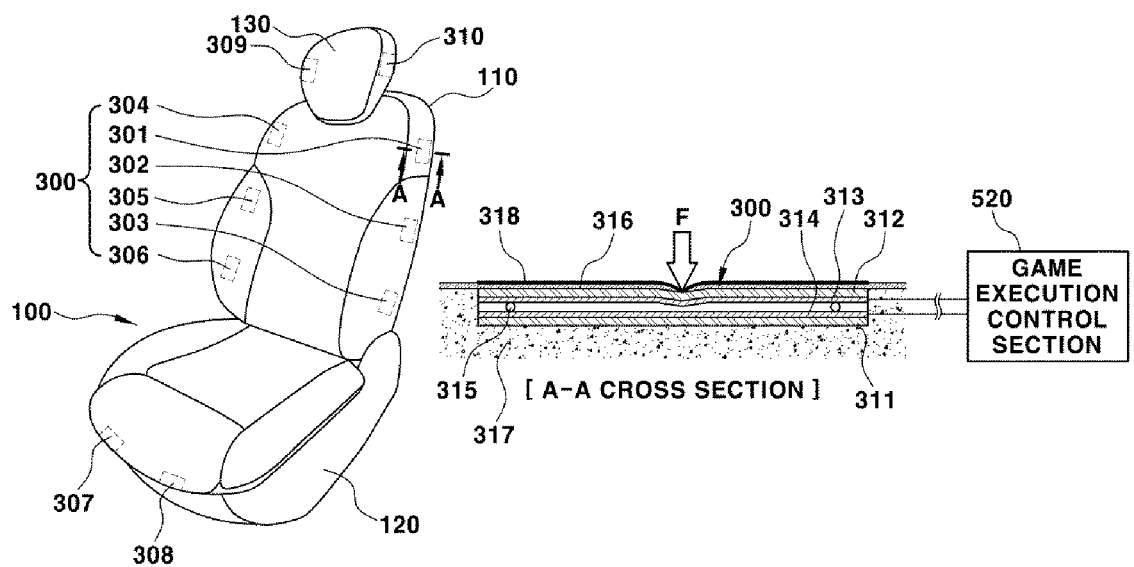
FIG. 2 is a configuration diagram illustrating an example of mounting a touch pad in the configuration of the entertainment device for the self-driving vehicle according to the present disclosure.

Referring to FIGS. 1 and 2, one or more touch pads, e.g., a plurality of touch pads 300 for sensing a touch pressure of the passenger so as to be used as an input signal for proceeding with the game, are mounted at positions of the seat back 110 and the seat cushion 120 where the passenger's hand reaches.

The plurality of touch pads 300 are composed of first, second, and third left touch pads 301, 302, 303 mounted at the left edge positions of the seat back 110 to be spaced apart from each other along the vertical direction, first, second, and third right touch pads 304, 305, 306 mounted at the right edge positions of the seat back 110 to be spaced apart from each other along the vertical direction, and first and second lower touch pads 307, 308 mounted at the front edge positions of the seat cushion 120 to be spaced apart from each other along a lateral direction.

In addition, first and second upper touch pads 309, 310 are further mounted at both side portions of the headrest 130.

As illustrated in FIG. 2, the plurality of touch pads 300 are a touch pressure sensing type built-in between a seat cover 316 and a seat foam 317, respectively, and composed of a flexible plastic layer 312 that is in close contact with the inner surface of the seat cover 316 and disposed at the outmost portion thereof, a glass layer 311 that is in contact with the outer surface of the seat foam 317 and disposed at the innermost portion thereof, a first Indium Tin Oxide (ITO) electrode layer 313 bonded with the inner surface of the flexible plastic layer 312 with a spacer 315 interposed therebetween, and a second Indium Tin Oxide (ITO) electrode layer 314 bonded with the outer surface of the glass layer 311.

Preferably, since the plurality of touch pads 300 are present inside the seat cover 316, a color layer 318 for informing the built-in position of each of the touch pads 300 is further coated on the outer surface of the seat cover 316.

Therefore, when a passenger touches and presses the color layer 318 using a predetermined pressure or more, the sensing operation of the touch pad is performed, and a sensed touch pressure signal is transmitted to the game operation computing section 530 of the control unit 500.

Figure 3:
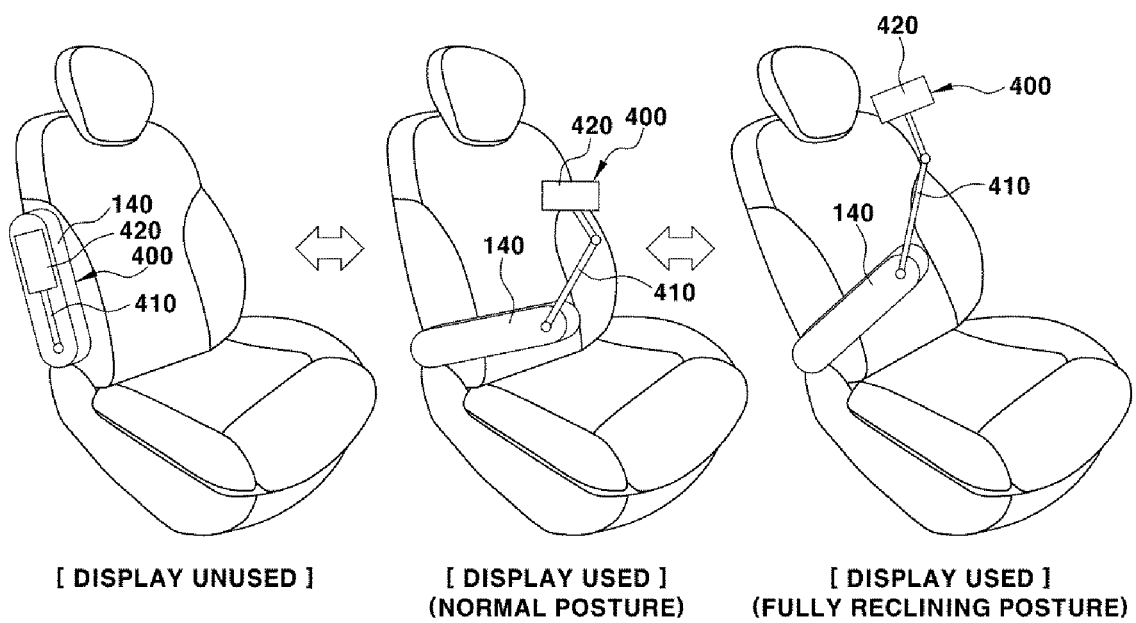
FIG. 3 is a schematic diagram illustrating an example of mounting a display in the configuration of the entertainment device for the self-driving vehicle according to the present disclosure.

Referring to FIG. 3, a display unit 400 for displaying the execution screen of the game selected by the passenger is disposed at a position visible to the passenger around the seat.

Preferably, the display unit 400 may be composed of a multi joint link 410 turnably connected to an armrest 140 mounted on one side portion of the seat, and a display 420 rotatably mounted on the distal end portion of the multi-joint link 410 through a hinge joint.

Therefore, the passenger may turn the multi-joint link 410 toward his/her front side, and then rotate the display 420 toward his/her viewpoint, thereby easily setting the position of the display 420 for the game.

Therefore, when the passenger turns on the power of the display 420 and then selects a game in a menu, the control unit 500 controls the overall execution of the game selected by the passenger based on a sensing signal of the body pressure sensor module 200 including the first and second body pressure sensor modules 210, 220 and a sensing signal of the touch pad 300 while outputting the execution screen of the game selected by the passenger on the display 420.

Figure 5:
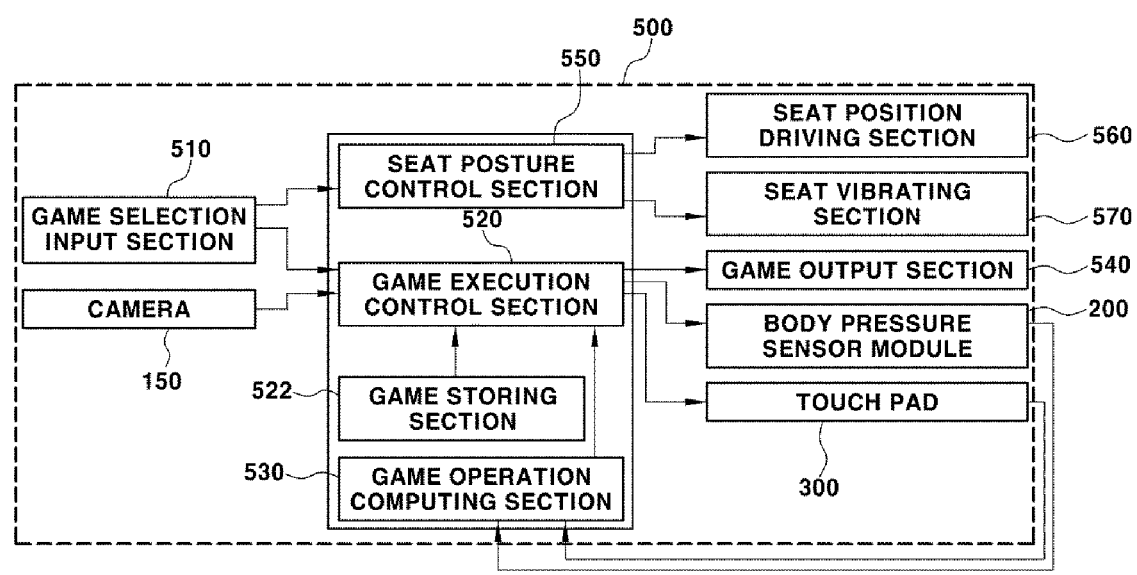
FIG. 5 is a block diagram illustrating a control for executing the entertainment device for the self-driving vehicle according to the present disclosure.

FIG. 5 is a block diagram illustrating a control for executing the entertainment device for the self-driving vehicle according to the present disclosure.

Referring to FIG. 5, the control unit 500 is configured to include a game selection input section 510 for inputting a game type and a mode, a game execution control section 520 for applying an activation signal to the body pressure sensor module 200 and the touch pad 300 while executing the game type and the mode inputted through the game selection input section 510, a game operation computing section 530 for computing a game proceeding operation of a current passenger (the body pressure change and distribution of the passenger, a confirmation of the pad position where the touch operation has been performed among the plurality of touch pads, etc.) by receiving the sensing signals of the body pressure sensor module 200 and the touch pad 300, and then inputting the computed result to the game execution control section 520, and a game output section 540 for outputting a sound while outputting the game execution screen to the display 420 according to the instruction of the game execution control section 520.

Therefore, when the passenger turns on the power of the display 420 and then selects a game in the menu, the control unit 500 displays the game selection input section 510 for inputting the game type and the mode in the execution screen of the game selected by the passenger on the display 420.

Then, when the passenger inputs the desired game type and mode through the game selection input section 510, the game execution control section 520 starts the sensing operations of the body pressure sensor module 200 and the touch pad 300 by applying an activation signal to the body pressure sensor module 200 and the touch pad 300.

For example, the body pressure sensor module 200 senses the body pressure change and distribution according to a change in various postures such as that the passenger moves the upper body and the lower body to the left side or the right side, reclines the upper body rearwards, or changes the body pressure of a hip or thigh side of the lower body in a state where he/she is seated on the seat, and transmits the sensed signal to the game operation computing section 530.

In addition, when the passenger touches and presses the color layer 318 with a predetermined pressure or more in a state where he/she is seated on the seat, at least one of the plurality of touch pads 300 senses the touch pressure, and the sensed touch pressure signal is transmitted to the game operation computing section 530.

Then, the game operation computing section 530 computes the game proceeding operation of a current passenger (the body pressure change and distribution of the passenger, a confirmation of the pad position where the touch operation among the plurality of touch pads has been performed, etc.) by receiving the sensing signals of the body pressure sensor module 200 and the touch pad 300, and then inputs the computed result to the game execution control section 520.

Therefore, the game execution control section 520 executes the game suitable for the execution scenario and the manual of the game selected by the passenger based on the computed result from the game operation computing section 530.

Preferably, the game execution control section 520 includes a game storing section 522 for storing the game types using the body pressure and the touch and the game types using only the body pressure or the touch, as a game selectable by the passenger, and retrieves and executes the game actually selected by the passenger from the game storing section 522.

For example, the game storing section 522 may store, as a game using the body pressure and/or the touch pressure, a luge game that requires the movement of the body pressure, a mole game that acquires a score by hitting(touching) a mole, a shooting game that shoots (touches) a target, a balancing game that adjusts the postural balance of a character by using the body pressure change, a maze game that turns by using the body pressure change, a flying game using the body pressure change and the touch, a racing game that requires the movement of the body pressure, etc.

Therefore, as described above, the game execution control section 520 retrieves and executes the game selected by the passenger among the games stored in the game storing section 522, such that the passenger may enjoy various games while touching one or more among the plurality of touch pads 300 and changing the body pressure with respect to the body pressure sensor module 200.

Meanwhile, the control unit 500 is configured to further include a seat posture control section 550 for outputting an adjustment signal of a seat posture suitable for the game type and the mode inputted through the game selection input section 510, a seat position driving section 560 for adjusting the seat posture according to the instruction of the seat posture control section 550 to a posture suitable for the game, and a seat vibrating section 570 for vibrating the seat in a specific situation while the game is executed according to the instruction of the game execution control section 520.

Preferably, the seat position driving section 560 may be adopted as a known electric reclining device mounted on the side portion of the seat back 110 to adjust the reclined angle of the seat back 110, a known electric height adjusting device mounted on the seat cushion 120 to adjust the front and rear height of the seat cushion 120, etc.

Therefore, when a signal for selecting and inputting the game type and the mode through the game selection input section 510 is transferred to the seat posture control section 550, the seat posture control section 550 instructs the adjustment signal of the seat posture suitable for the selected game to the seat position driving section 560, and the seat posture may be adjusted to a posture suitable for the game by the driving of the seat position driving section 560.

For example, in a case where the game type selected and inputted through the game selection input section 510 is a luge game that lies down and rides a sled, the seat posture where the seat back 110 is reclined rearwards at a certain angle is implemented by the driving of the seat position driving section 560.

Figure 6B:
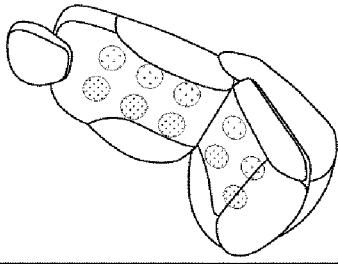
FIGS. 6B to 6F are diagrams illustrating a method for executing the luge game by using the entertainment device for the self-driving vehicle according to the present disclosure.
Figure 6C:
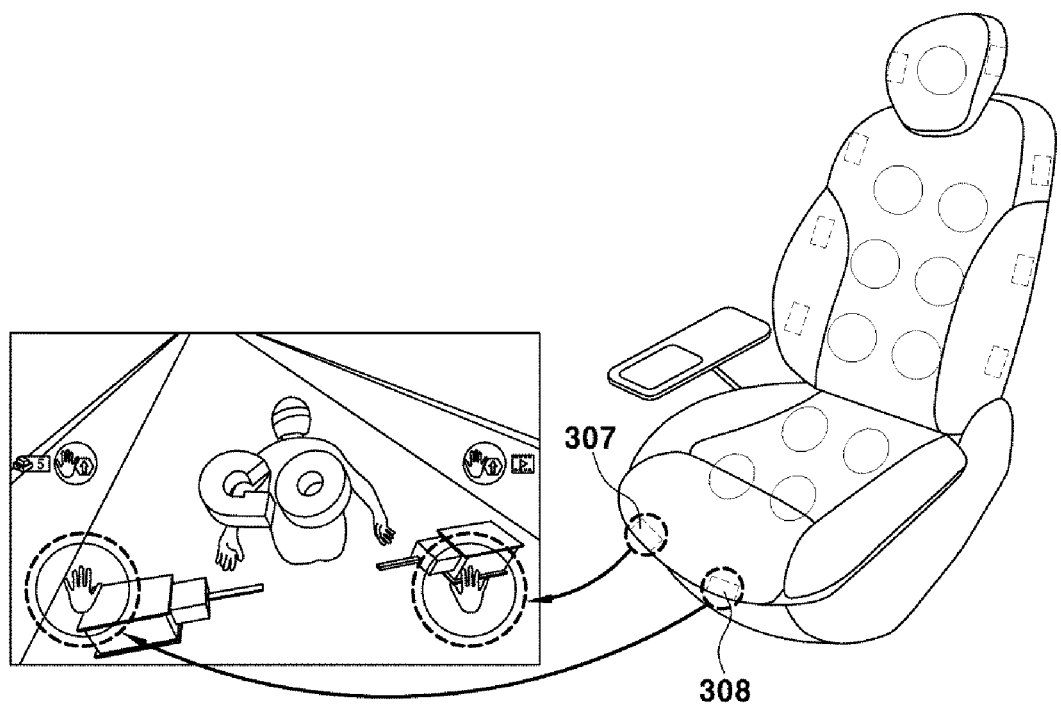
Figure 6D:
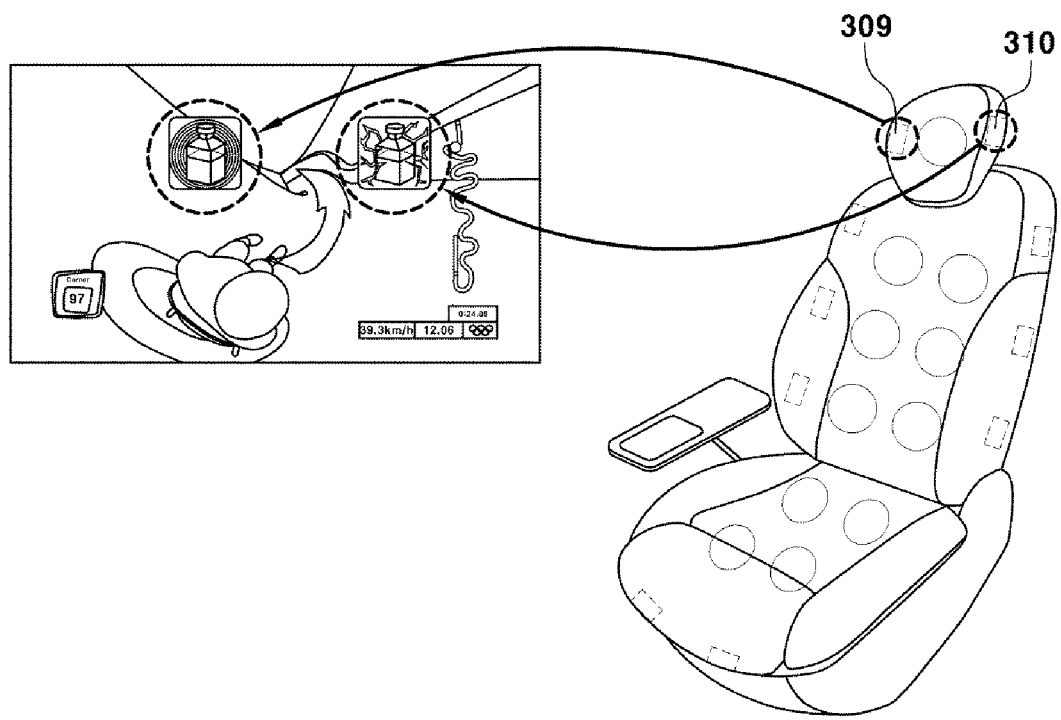
Figure 6E:
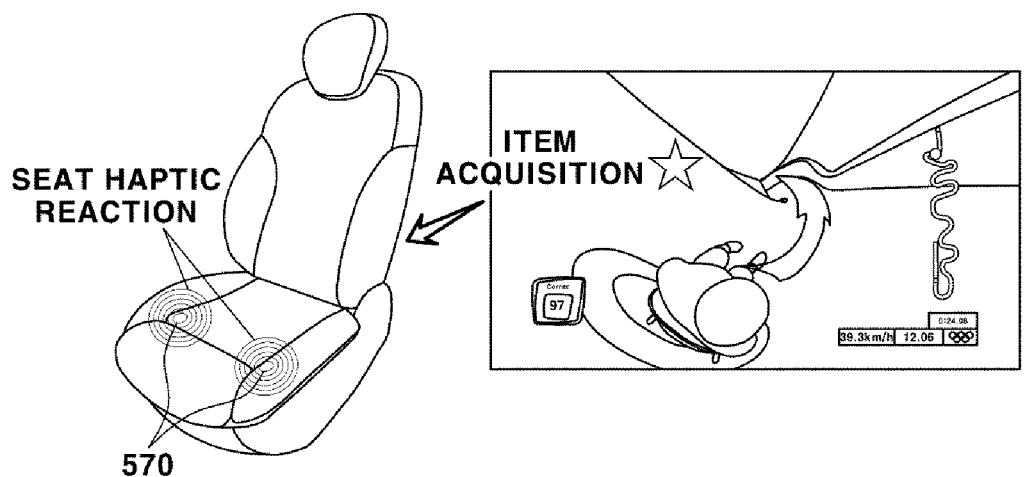
Figure 6F:
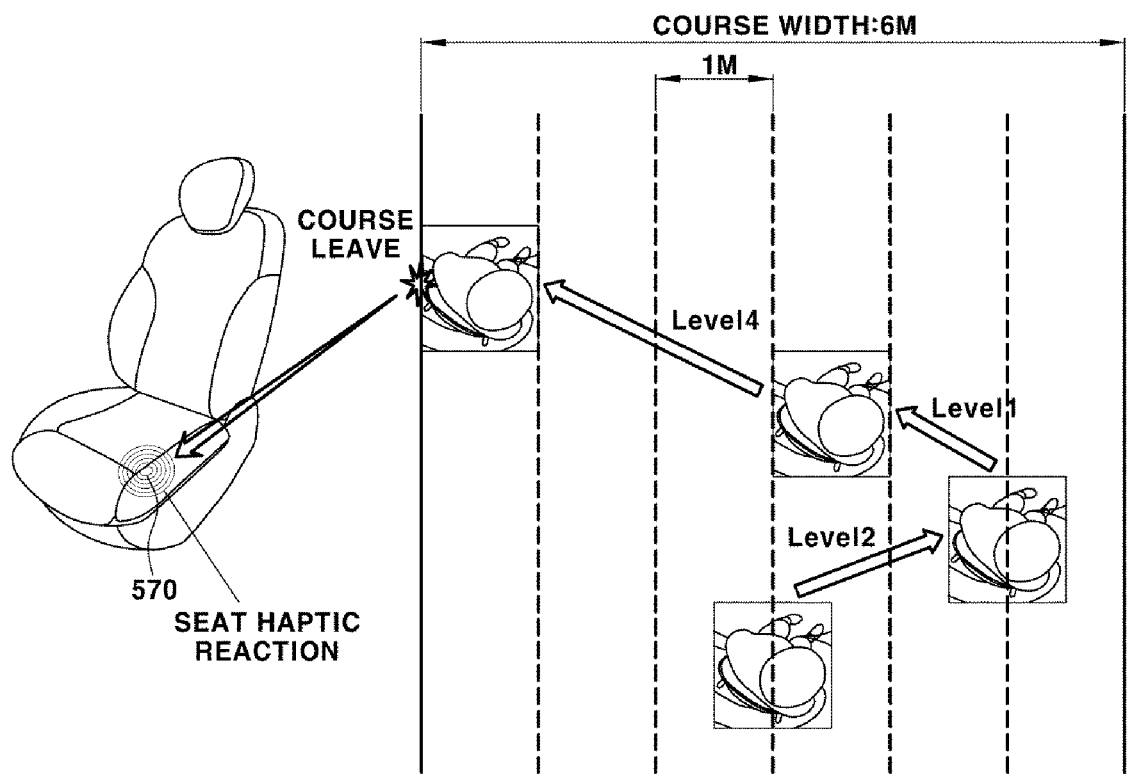

Preferably, the seat vibrating section 570 may be adopted as a vibrating element mounted on the seat back 110 or as illustrated in FIGS. 6E and 6F, at a predetermined position of the seat cushion 120 to provide the haptic reaction in a specific situation while the game is executed (when leaving a game course or acquiring a game point).

Therefore, in a specific situation leaving the luge game course while the luge game is executed according to the instruction of the game execution control section 520, as illustrated in FIG. 6F, the seat vibrating section 570 provides the haptic reaction so that the passenger may recognize leaving the course, and even in a specific situation acquiring the game point, as illustrated in FIG. 6E, the seat vibrating section 570 provides the haptic reaction so that the passenger may recognize the game point acquiring situation.

Herein, an entertainment method of the present disclosure performed based on the above configuration will be sequentially described as follows.

Firstly, the passenger turns on the power of the display 420, and then the passenger selects and inputs a game type and a mode through the game selection input section 510 displayed through the display 420.

Then, the game execution control section 520 applies an activation signal to the body pressure sensor module 200 and the plurality of touch pads 300 mounted on the seat while executing the game type and the mode selected by the passenger.

Therefore, the body pressure sensor module 200 and the touch pad 300 start sensing the body pressure distribution and the touch pressure of the passenger.

More specifically, the first body pressure sensor module 210 senses an upper body pressure distribution according to the upper body movement of the passenger, and the second body pressure sensor module 220 senses a lower body pressure distribution according to the lower body movement of the passenger, and as illustrated in FIG. 4, sensing may be performed by classifying a body pressure generating rate into high, medium, low, etc., respectively, and then transmitting it to the game operation computing section 530 of the control unit 500.

For example, the body pressure sensor module 200 senses the body pressure change and distribution according to a change in various postures such as that the passenger moves the upper body and the lower body to the left side or the right side, reclines the upper body rearwards, or changes the body pressure of the hip or thigh side of the lower body in a state where he/she had seated on the seat, and transmits the sensed signal to the game operation computing section 530.

In addition, when the passenger touches and presses the color layer 318 with a predetermined pressure or more in a state where he/she is seated on the seat, one or more among the plurality of touch pads 300 sense the touch pressure, and the sensed touch pressure signal is transmitted to the game operation computing section 530.

Next, the game operation computing section 530 computes the game proceeding operation of the current passenger (the body pressure change and distribution of the passenger, a confirmation of the pad position where a touch operation among the plurality of touch pads has been performed, etc.) by receiving the sensing signals of the body pressure sensor module 200 and the touch pad 300, and then inputs the computed result to the game execution control section 520.

Therefore, the game execution control section 520 executes the game suitable for the execution scenario and the manual of the game selected by the passenger based on the computed result from the game operation computing section 530, such that the game output section 540 outputs the game execution screen and the sound.

As described above, when the passenger feels boredom with the corresponding game or plays the corresponding game for too long while the passenger enjoys the game, recommending whether to end the game is performed.

For this purpose, a facial expression recognizing camera 150 for determining whether to end the game by recognizing the facial expression of the passenger is mounted on an interior headlining of a vehicle, etc.

Figure 10A:
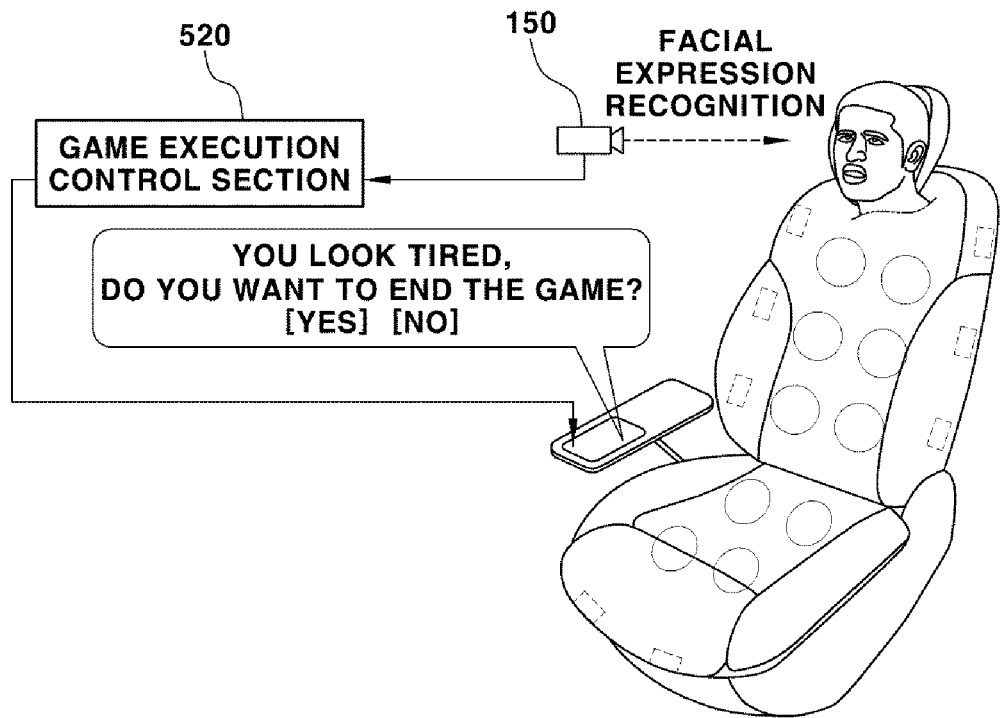
FIGS. 10A and 10B are diagrams illustrating a game end guiding method using the entertainment device for the self-driving vehicle according to the present disclosure.

Therefore, as illustrated in FIG. 10A, when the facial expression recognizing camera 150 recognizes the facial expression of the passenger who plays the game in real time, and then the facial expression of the passenger expresses boredom or tiredness based on a facial expression recognizing algorithm, the facial expression recognizing camera 150 inputs an end recommending signal to the game execution control section 520.

Subsequently, the game execution control section 520 may output a message that recommends to end the game or recommends whether to proceed to another game to the display 420, thereby inducing the passenger who plays the game to end the game or select another game.

Figure 10B:
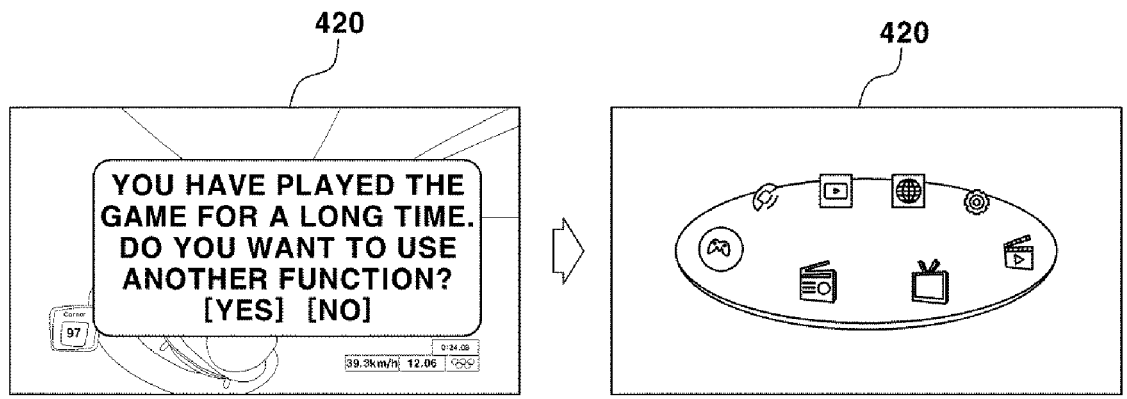

Alternatively, as illustrated in FIG. 10B, recommending whether to end the game may proceed with counting a game execution time in the game execution control section 520, and outputting the message that recommends to end the game or recommends whether to proceed to another game to the display 420 in the game execution control section 520 when the game execution time is a certain time or more.

Herein, an example of executing the luge game implemented by the entertainment device and method according to the present disclosure will be described as follows.

FIG. 6A is a flowchart illustrating a procedure of executing a luge game using the entertainment device for the self-driving vehicle according to the present disclosure, and FIGS. 6B to 6F are diagrams illustrating a method for executing the luge game.

Firstly, when the game type selected and inputted through the game selection input section 510 is the luge game that lies down and rides a sled, the seat posture where the seat back 110 is fully reclined is implemented by the driving of the seat position driving section 560 (S101).

For example, the seat back is fully reclined rearwards by an electric reclining device.

In addition, the passenger turns the multi-joint link 410 toward his/her front side, and then rotates the display 420 toward his/her viewpoint so that the position of the display 420 for the game may be set (S102).

Subsequently, the game execution control section 520 displays the method (see FIG. 6B) and the course explanation of the luge game to guide it to the passenger, and then executes the luge game (S103).

With the start of the luge game, the passenger changes the body pressure according to the course of the luge game, and as illustrated in FIG. 6B, a constant speed, acceleration, deceleration, a turn left, and a turn right may be performed according to the body pressure change.

Constant Speed

The constant speed of the luge game may be performed in a state where the sensing body pressure between the left body pressure sensors 211, 212, 213 and the right body pressure sensors 214, 215, 216 of the first body pressure sensor module 210 is uniform, and the sensing body pressure between the left body pressure sensors 221, 222 and the right body pressure sensors 223, 224 of the second body pressure sensor module 220 is uniform, and a state where the body pressure is intensively sensed in the $1\text{-}3^{th}$ left body pressure sensor 213 for sensing the body pressure of the left waist of the passenger, the $1\text{-}3^{th}$ right body pressure sensor 216 for sensing the body pressure of the right waist of the passenger, the $2\text{-}1^{th}$ left body pressure sensor 221 for sensing the body pressure of the left hip of the passenger, and the $2\text{-}1^{th}$ right body pressure sensor 223 for sensing the body pressure of the right hip of the passenger.

Acceleration

The acceleration of the luge game may be performed in a state where the body pressure is intensively sensed in the $1\text{-}1^{th}$ left body pressure sensor 211 for sensing the body pressure of the left upper back of the passenger, the $1\text{-}1^{th}$ right body pressure sensor 214 for sensing the body pressure of the right upper back of the passenger, the $2\text{-}1^{th}$ left body pressure sensor 221 for sensing the body pressure of the left hip of the passenger, and the $2\text{-}1^{th}$ right body pressure sensor 223 for sensing the body pressure of the right hip of the passenger.

Deceleration

The deceleration of the luge game may be performed in a state where the body pressure is intensively sensed in the $2\text{-}1^{th}$ left body pressure sensor 221 for sensing the body pressure of the left hip of the passenger, the $2\text{-}2^{th}$ left body pressure sensor 222 for sensing the body pressure of the left thigh of the passenger, the $2\text{-}1^{th}$ right body pressure sensor 223 for sensing the body pressure of the right hip of the passenger, and the $2\text{-}2^{th}$ right body pressure sensor 224 for sensing the body pressure of the right thigh of the passenger.

Turn Left

The turn left of the luge game may be performed in a state where the body pressure is intensively sensed in the $1\text{-}1^{th}$ left body pressure sensor 211 for sensing the body pressure of the left upper back of the passenger, the $1\text{-}2^{th}$ left body pressure sensor 212 for sensing the body pressure of the left middle back of the passenger, the $1\text{-}3^{th}$ left body pressure sensor 213 for sensing the body pressure of the left waist of the passenger, the $2\text{-}1^{th}$ left body pressure sensor 221 for sensing the body pressure of the left hip of the passenger, and the $2\text{-}2^{th}$ left body pressure sensor 222 for sensing the body pressure of the left thigh of the passenger.

Turn Right

The turn right of the luge game may be performed in a state where the body pressure is intensively sensed in the $1\text{-}1^{th}$ right body pressure sensor 214 for sensing the body pressure of the right upper back of the passenger, the $1\text{-}2^{th}$ right body pressure sensor 215 for sensing the body pressure of the right middle back of the passenger, the $1\text{-}3^{th}$ right body pressure sensor 216 for sensing the body pressure of the right waist of the passenger, the $2\text{-}1^{th}$ right body pressure sensor 223 for sensing the body pressure of the right hip of the passenger, and the $2\text{-}2^{th}$ right body pressure sensor 224 for sensing the body pressure of the right thigh of the passenger.

As described above, the first body pressure sensor module 210 and the second body pressure sensor module 220 analyze the body pressure change (movement) of the passenger participating in the luge game to transmit it to the game operation computing section 530 of the control unit 500 (S104).

That is, the first body pressure sensor module 210 senses the upper body pressure distribution according to the upper body movement of the passenger, the second body pressure sensor module 220 senses the lower body pressure distribution according to the lower body movement of the passenger, and sensing may be performed by classifying a body pressure generating rate into high, medium, low, etc., respectively, and then transmitting it to the game operation computing section 530 of the control unit 500.

Subsequently, the game operation computing section 530 performs computation such as synchronizing the body pressure changing operation of the passenger with the character (the luge player) posture in the game based on the above-described body pressure sensing signal of the passenger (S105).

Therefore, the game execution control section 520 executes the game suitable for the execution scenario and the manual of the luge game based on the computed result from the game operation computing section 530.

At this time, as illustrated in FIG. 6C, a method in which the passenger starts the luge game may proceed with a method for repeatedly touching the first and second lower touch pads 307, 308 mounted at the front edge position of the seat cushion 120 to be spaced apart from each other along a lateral direction with a hand.

In addition, when the passenger is confronted with a specific situation while enjoying the luge game (e.g., an item, etc. appears at a specific position of the luge course), as illustrated in FIG. 6D, it may proceed with a method in which the passenger may take an operation of touching the first and second upper touch pads 309, 310 mounted on both side portions of the headrest 130 to acquire the corresponding item.

In addition, when a specific situation occurs while the passenger enjoys the luge game (e.g., the item appearing in the luge course has been successfully acquired), as illustrated in FIG. 6E, the seat vibrating section 570 vibrates according to the instruction of the game execution control section 520 so that the passenger may recognize to succeed in acquiring the item.

As described above, the game execution control section 520 analyzes whether to leave the luge course while the luge game is executed (S106).

For example, as illustrated in Table 1 below, the body pressure generating rate and the concentration of the passenger are classified into the first to fourth levels and scored, and whether to leave the luge course is analyzed in a state where a moving distance in the course width direction has been set for each level.

TABLE 1

| | Laterally moving distance | | |
|---|---|---|---|
| Classification | Body pressure generating rate (PAR) | Body pressure concentration (PAUE) | Moving distance (per 0.5 seconds) |
| Level 1 | 300~350 points | 250~300 points | ~0.75M |
| Level 2 | 300~350 points | 300 points ↑ | 0.75~1M |
| Level 3 | 350 points ↑ | 250~300 points | 1~1.25M |
| Level 4 | 350 points ↑ | 300 points ↑ | 1.25M~1.5M |

Upon analyzing whether to leave the course of the luge game, it is confirmed whether it is a course leave crisis (S107), and when it is determined as the course leave, as illustrated in FIG. 6F, any one side of the seat vibrating section 570 is vibrated according to the instruction of the game execution control section 520 so that the passenger may recognize the course leave (S108).

In addition, the game execution control section 520 determines a specific situation (e.g., whether the item appearing in the luge course has been successfully acquired) while the passenger enjoys the luge game (S109), and when it is confirmed to acquire the item, the point, etc. as the determination result (S110), a game score is calculated by a method for summing the point, the time score, etc. (S111).

Herein, an example of executing a mole game implemented by the entertainment device and method according to the present disclosure will be described as follows.

Figure 7A:
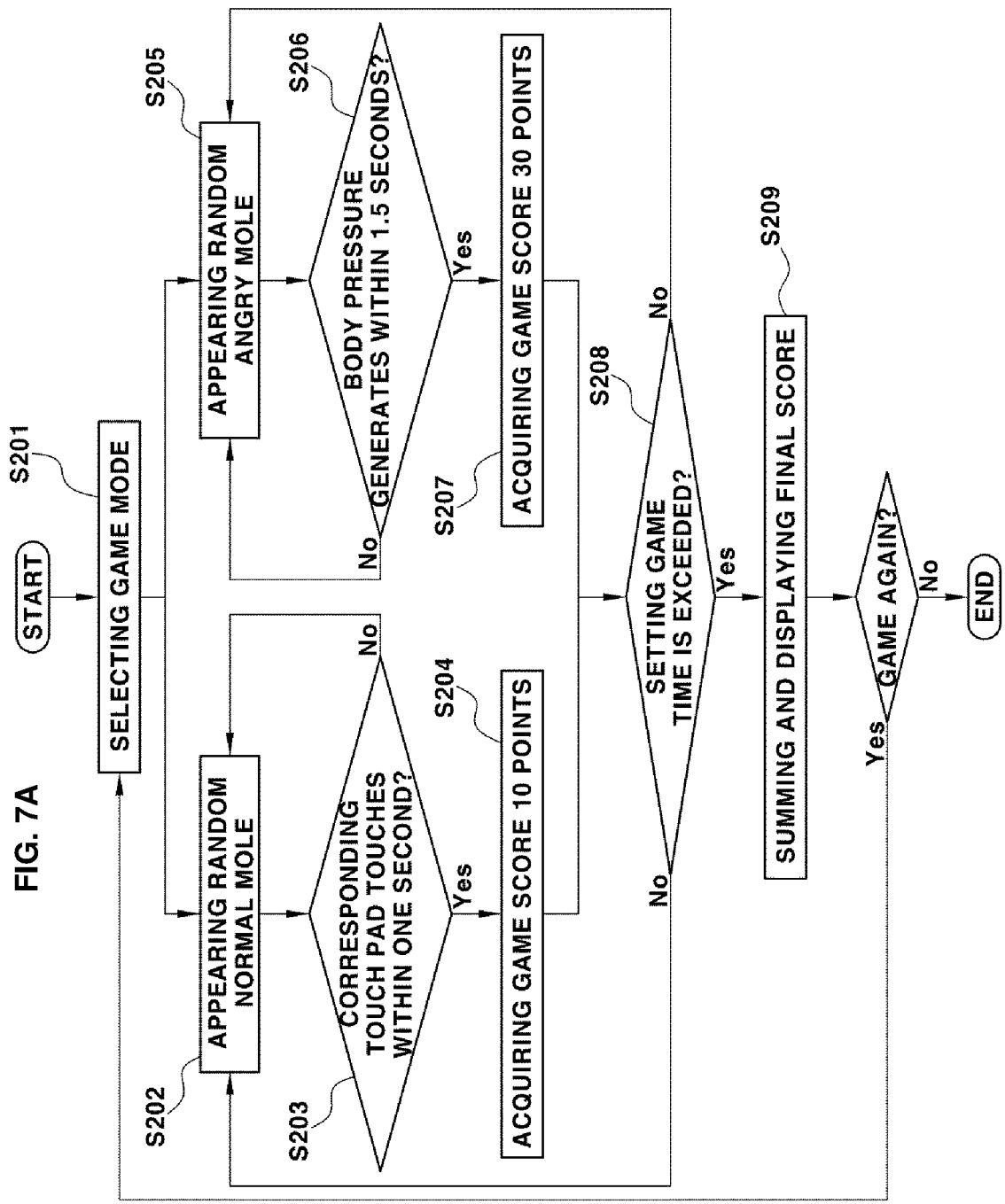
FIG. 7A is a flowchart illustrating a procedure of executing a mole game using the entertainment device for the self-driving vehicle according to the present disclosure.
Figure 7B:
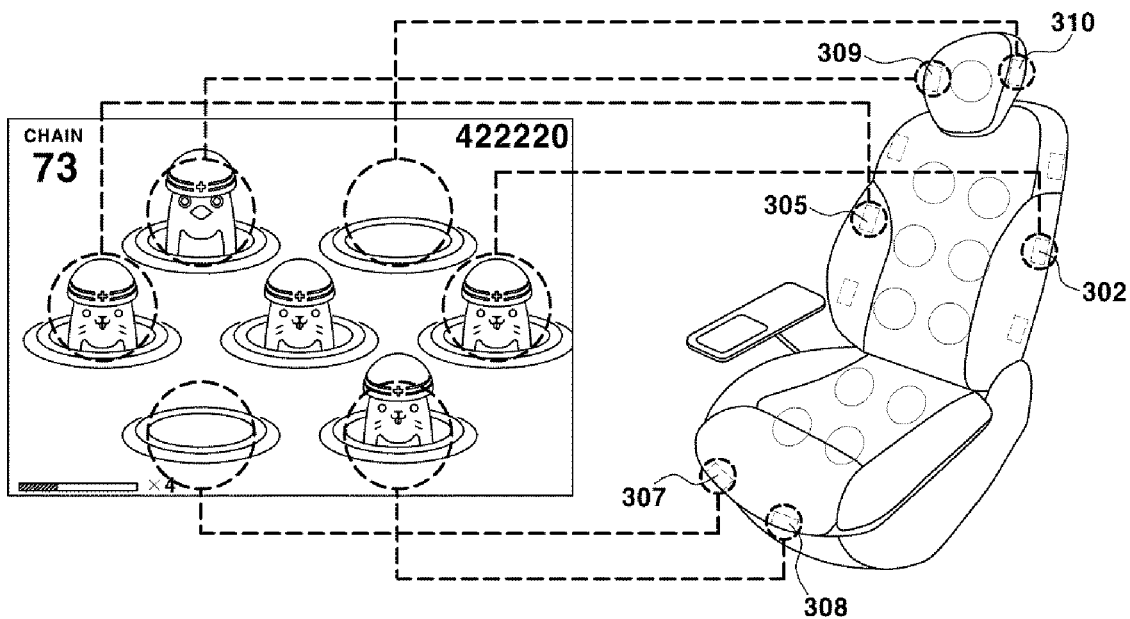
FIGS. 7B and 7C are diagrams illustrating a method for executing the mole game using the entertainment device for the self-driving vehicle according to the present disclosure.
Figure 7C:
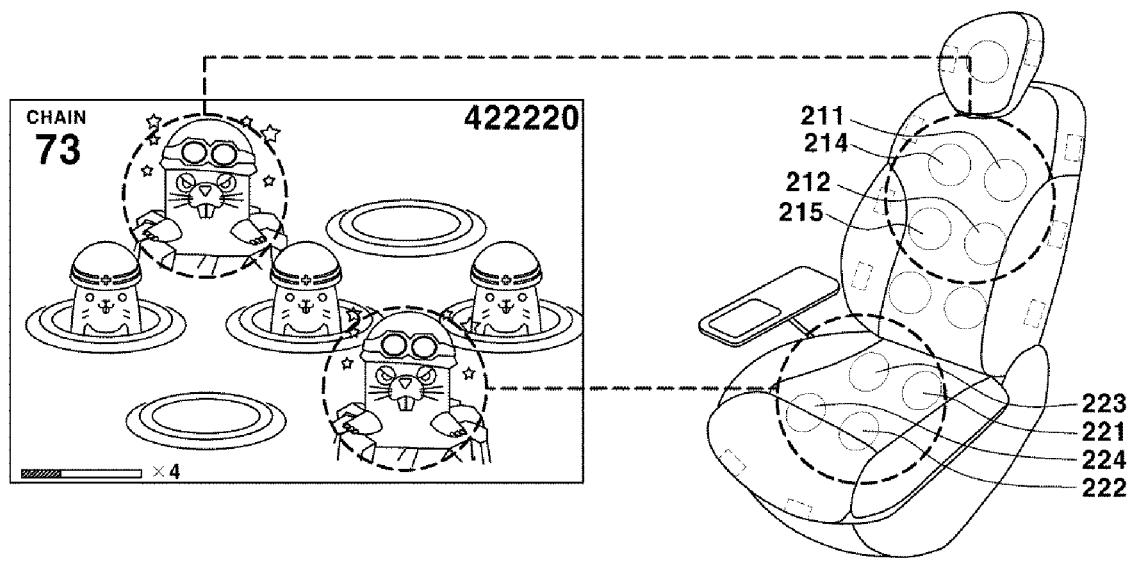

FIG. 7A is a flowchart illustrating a procedure of executing a mole game using the entertainment device for the self-driving vehicle according to the present disclosure, and FIGS. 7B and 7C are diagrams illustrating a method for executing the mole game.

Firstly, when the game type selected and inputted through the game selection input section 510 is a mole game hitting a mole, the passenger selects a game mode (e.g., an easy mode or a difficult mode) (S201).

Subsequently, the game execution control section 520 guides the explanatory text for explaining a mole game method through the display 420, and then executes the mole game.

For example, as illustrated in FIG. 7B, the game execution control section 520 guides whether any touch pad among the plurality of touch pads 300 coincides with a region where the mole appears in the display 420 and then executes the mole game.

Therefore, when the game mode is in an easy mode, as illustrated in FIG. 7B, a mole randomly appears on the display 420 (S202), and the passenger enjoys the game by a method for touching one or more among the plurality of touch pads 300.

For example, when the passenger presses one or more touch pads, which has been set, for hitting the appeared mole among the plurality of touch pads 300 within one second (S203), the passenger acquires the game score (e.g., acquires 10 points) (S204).

On the other hand, when the game mode is in a difficult mode, as illustrated in FIG. 7C, the large mole with angry facial expression appears in the display 420 (S205), and the passenger may enjoy the game by a method for concentrating the body pressure in the first body pressure sensor module 210 or the second body pressure sensor module 220 to remove the large mole.

For example, when the passenger concentrates the body pressure in the first body pressure sensor module 210 or the second body pressure sensor module 220 within 1.5 seconds in order to remove the appeared large mole (S206), the passenger acquires the game score (e.g., acquires 30 points) by removing the mole (S207).

The game execution control section 520 determines whether to exceed a setting game time during the mole game (S208), and when the setting time is exceeded, a final summing score is displayed in the display 420 (S209).

Herein, an example of executing a rhythm dance game implemented by the entertainment device and method according to the present disclosure will be described as follows.

Figure 8A:
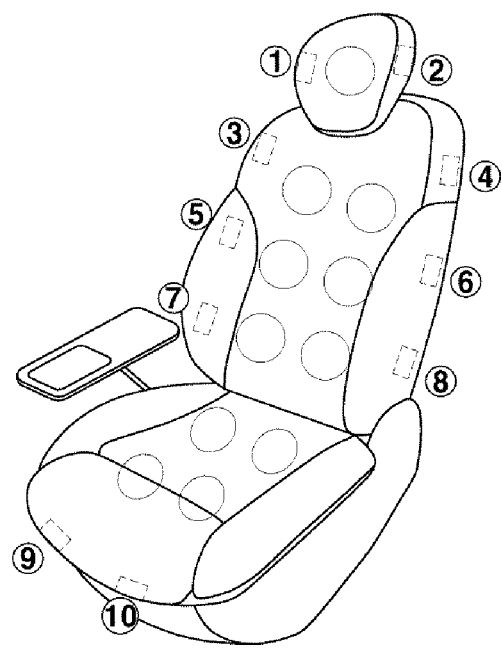
FIGS. 8A and 8B are diagrams illustrating a method for executing a rhythm dance game using the entertainment device for the self-driving vehicle according to the present disclosure.
Figure 8B:
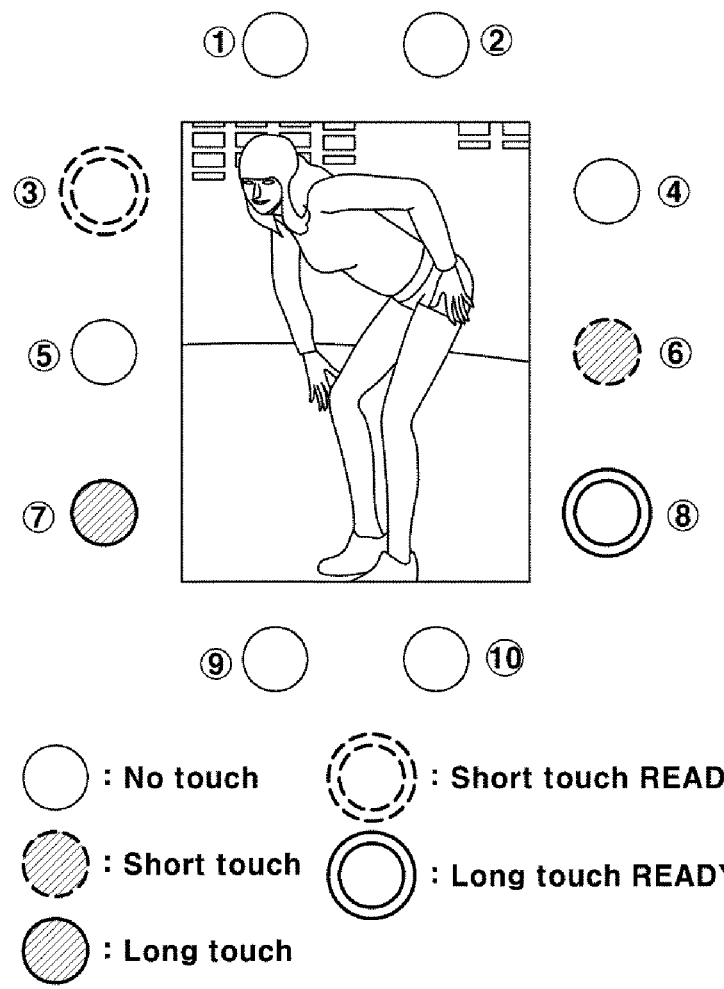

FIGS. 8A and 8B are diagrams illustrating a method for executing a rhythm dance game using the entertainment device for the self-driving vehicle according to the present disclosure.

Firstly, when the game type selected and inputted through the game selection input section 510 is a rhythm dance game, the game execution control section 520 guides the explanatory text for explaining a rhythm dance game method through the display 420, and then executes the rhythm dance game.

For example, the numbering for the plurality of touch pads 300 is displayed as illustrated in FIG. 8A, and the numbering is also displayed in the touch region displayed in the display 420 as illustrated in FIG. 8B.

Therefore, the game proceeds with a method in which the passenger touches the touch pad corresponding to the numbering of the touch region displayed in the display 420 among the plurality of touch pads 300 for a short time or a certain time or more.

Figure 9:
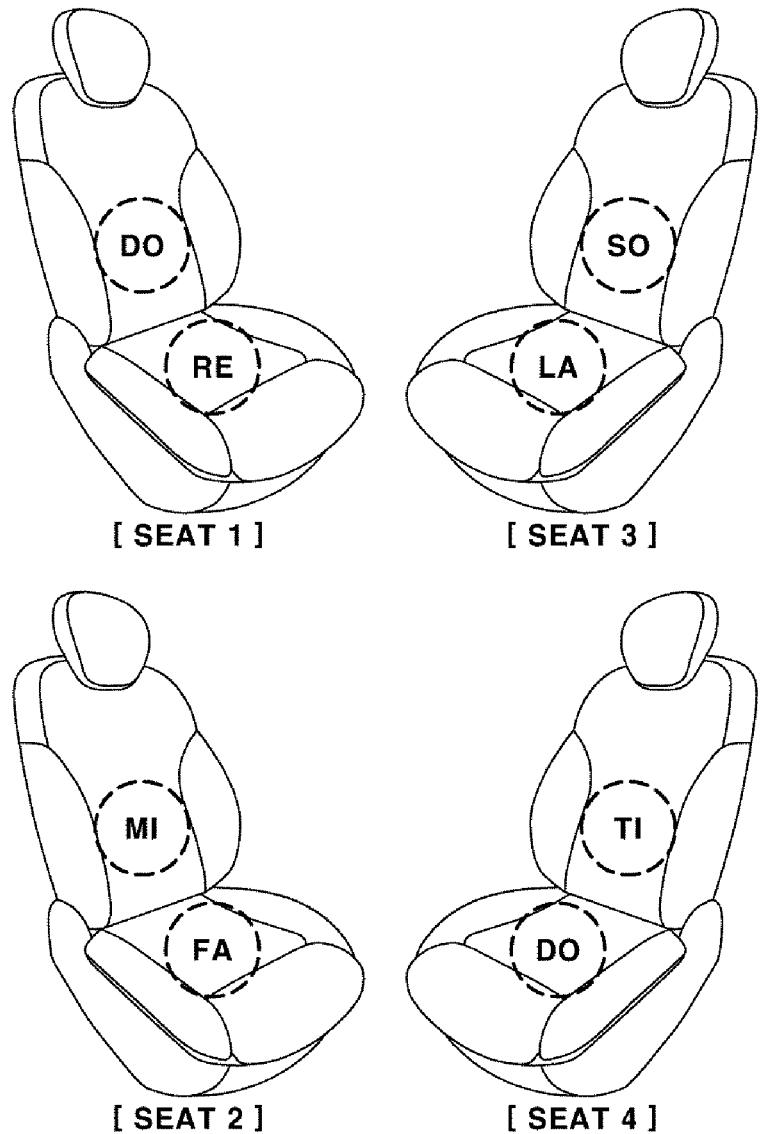
FIG. 9 is a diagram illustrating a method for executing an ensemble game using the entertainment device for the self-driving vehicle according to the present disclosure.

Meanwhile, as illustrated in FIG. 9, the passengers riding in a first seat to a fourth seat of the self-driving vehicle, respectively, may play an ensemble game.

For example, the passengers may play the ensemble game by a method in which the passengers watch the score displayed in their display, and concentrate the body pressure in the body pressure sensor module when their own turn comes back.

In addition, as a game using the body pressure and/or the touch pressure, the passenger may enjoy by selecting a shooting game that shoots (touches) a target, a balancing game that adjusts the postural balance of a character by using the body pressure change, a maze game that turns by using the body pressure change, a flying game using the body pressure change and the touch, a racing game that requires the movement of the body pressure, etc. through the game selection input section 510.

As described above, it is possible to execute and proceed the game based on the body pressure distribution signal sensed in the body pressure sensor when the passenger moves the upper body and the lower body in a state where he/she is seated on the seat of the self-driving vehicle, which will be released later, and the touch pressure signal that touches the touch pad while moving the arm and the finger, thereby providing the entertainment effect that makes the passenger have fun out of the boredom while providing the exercise effect moving the body to the passenger.

As described above, although the embodiments of the present disclosure have been described in detail, the claims of the present disclosure is not limited to the above-described embodiments, and various modifications and improvements by those skilled in the art using the basic concept of the present disclosure defined in the appended claims may also be included the claims of the present disclosure.

What is claimed is:

1. An entertainment method for a self-driving vehicle, comprising:
    selecting and inputting a game type and a mode by a passenger through a game selection input section of a control unit;
    applying an activation signal to a body pressure sensor module and a touch pad mounted on a seat while executing the game type and the mode selected by the passenger in a game execution control section of the control unit;
    sensing a body pressure distribution and a touch pressure of the passenger in the body pressure sensor module and the touch pad;
    computing a game proceeding operation of the passenger by receiving sensing signals of the body pressure sensor module and the touch pad in a game operation computing section of the control unit, and then inputting the computed result to the game execution control section; and
    outputting a game execution screen and a sound according to the instruction of the game execution control section in a game output section,
    wherein the game execution screen is displayed on a display based on the body pressure distribution signal sensed in the body pressure sensor when the passenger moves the upper body and the lower body in a state where the passenger is seated on the seat equipped with the body pressure sensor and the touch pad, and the touch pressure signal that touches the touch pad while moving the passenger's arm and the passenger's finger to provide various games related to the body pressure and the touch signal.

2. The entertainment method for the self-driving vehicle of claim 1, wherein the body pressure sensor module comprises:
    a first body pressure sensor module arranged in laterally symmetrical positions of a seat back to sense an upper body pressure distribution of the passenger; and
    a second body pressure sensor module arranged in the laterally symmetrical positions of a seat cushion to sense a lower body pressure distribution of the passenger.

3. The entertainment method for the self-driving vehicle of claim 2, wherein the first body pressure sensor module comprises:
    a $1\text{-}1^{th}$ left body pressure sensor for sensing a body pressure of a left upper back of the passenger;
    a $1\text{-}2^{th}$ left body pressure sensor for sensing a body pressure of a left middle back of the passenger;
    a $1\text{-}3^{th}$ left body pressure sensor for sensing a body pressure of a left waist of the passenger;
    a $1\text{-}1^{th}$ right body pressure sensor for sensing a body pressure of a right upper back of the passenger;
    a $1\text{-}2^{th}$ right body pressure sensor for sensing a body pressure of aright middle back of the passenger; and
    a $1\text{-}3^{th}$ right body pressure sensor for sensing a body pressure of aright waist of the passenger.

4. The entertainment method for the self-driving vehicle of claim 2, wherein the second body pressure sensor module comprises:
    a $2\text{-}1^{th}$ left body pressure sensor for sensing a body pressure of a left hip of the passenger;
    a $2\text{-}2^{th}$ left body pressure sensor for sensing a body pressure of a left thigh of the passenger;
    a $2\text{-}1^{th}$ right body pressure sensor for sensing a body pressure of a right hip of the passenger; and
    a $2\text{-}2^{th}$ right body pressure sensor for sensing a body pressure of a right thigh of the passenger.

5. The entertainment method for the self-driving vehicle of claim 1, wherein the touch pad is selected from one of a plurality of touch pads, the plurality of touch pads comprising:
    first, second, and third left touch pads arranged in a left edge position of the seat back to be spaced apart from each other along a vertical direction;

first, second, and third right touch pads arranged in a right edge position of the seat back to be spaced apart from each other along the vertical direction;

first and second lower touch pads arranged in a front edge position of the seat cushion to be spaced apart from each other along a lateral direction; and first and second upper touch pads arranged in both side portions of a headrest.

6. The entertainment method for the self-driving vehicle of claim 1, wherein the control unit comprises:

the game selection input section for inputting a game type and a mode;

the game execution control section for applying an activation signal to the body pressure sensor module and the touch pad while executing the game type and the mode inputted through the game selection input section;

the game operation computing section for computing a game proceeding operation of a current passenger by receiving the sensing signals of the body pressure sensor module and the touch pad, and then inputting the computed result to the game execution control section;

a game output section for outputting a game execution screen and a sound according to the instruction of the game execution control section;

a seat posture control section for outputting an adjustment signal of the seat posture suitable for the game type and the mode inputted through the game selection input section;

a seat position driving section for adjusting the seat posture according to the instruction of the seat posture control section; and a seat vibrating section for vibrating the seat in a specific situation while the game is executed according to the instruction of the game execution control section.

7. The entertainment method for the self-driving vehicle of claim 6, wherein the game execution control section executes the game selected by the passenger among the game types using the body pressure and the touch stored in a game storing section, and the game types using only the body pressure or the touch.

8. The entertainment method for the self-driving vehicle of claim 1, further comprising:

outputting an adjustment signal of a seat posture suitable for the game type and the mode inputted through the game selection input section in a seat posture control section; and adjusting the seat posture according to an instruction of the seat posture control section in a seat position driving section.

9. The entertainment method for the self-driving vehicle of claim 8, wherein the seat position driving section is adopted as an electric reclining device mounted on the seat back, and an electric height adjusting device mounted on the seat cushion.

10. The entertainment method for the self-driving vehicle of claim 1, further comprising vibrating the seat in a specific situation while the game is executed according to the instruction of the game execution control section in a seat vibrating section.

11. The entertainment method for the self-driving vehicle of claim 1, further comprising recommending whether to end the game while the passenger proceeds with the game.

12. The entertainment method for the self-driving vehicle of claim 11, wherein recommending whether to end the game comprises:

recognizing a facial expression of the passenger in a facial expression recognizing camera while the passenger proceeds with the game;

inputting an end recommendation signal to the game execution control section in the facial expression recognizing camera, when the facial expression of the passenger expresses boredom or tiredness; and outputting a message that recommends to end the game or recommends whether to proceed with another game to a display in the game execution control section.

13. The entertainment method for the self-driving vehicle of claim 11, wherein recommending whether to end the game comprises:

counting a game execution time in the game execution control section; and outputting a message that recommends to end the game or recommends whether to proceed to another game to a display in the game execution control section, when the game execution time becomes a certain time or more.

* * * * *